No. 701,467. Patented June 3, 1902.
J. H. CLARK & A. MAYER.
WIRE NAIL MACHINE.
(Application filed June 1, 1901.)
(No Model.) 6 Sheets—Sheet 2.

Fig. 2.

Witnesses:
H. B. Hallock
L. H. Morrison

Inventors:
James H. Clark.
Alfred Mayer.
By
W. Preston Williamson.
Atty.

No. 701,467.

Patented June 3, 1902.

J. H. CLARK & A. MAYER.
WIRE NAIL MACHINE.
(Application filed June 1, 1901.)

(No Model.)

Witnesses:
H. B. Hallock.
L. H. Morrison.

Inventors:
James H. Clark.
Alfred Mayer.
By W. Preston Williamson
Atty.

No. 701,467. Patented June 3, 1902.
J. H. CLARK & A. MAYER.
WIRE NAIL MACHINE.
(Application filed June 1, 1901.)
(No Model.) 6 Sheets—Sheet 4.

Witnesses:
H. P. Hallock.
L. A. Morrison.

Inventors:
James H. Clark.
Alfred Mayer.
By W. Preston Williamson.
Atty.

No. 701,467. Patented June 3, 1902.
J. H. CLARK & A. MAYER.
WIRE NAIL MACHINE.
(Application filed June 1, 1901.)
(No Model.) 6 Sheets—Sheet 5.

Witnesses:
H. B. Hallock,
L. H. Morrison

Inventors:
James H. Clark
Alfred Mayer
By W. Preston Williamson
Atty.

No. 701,467. Patented June 3, 1902.
J. H. CLARK & A. MAYER.
WIRE NAIL MACHINE.
(Application filed June 1, 1901.)

(No Model.) 6 Sheets—Sheet 6.

UNITED STATES PATENT OFFICE.

JAMES H. CLARK AND ALFRED MAYER, OF PHILADELPHIA, PENNSYLVANIA.

WIRE-NAIL MACHINE.

SPECIFICATION forming part of Letters Patent No. 701,467, dated June 3, 1902.

Application filed June 1, 1901. Serial No. 62,720. (No model.)

*To all whom it may concern:*

Be it known that we, JAMES H. CLARK and ALFRED MAYER, citizens of the United States, residing at Philadelphia, county of Philadelphia, and State of Pennsylvania, have invented a certain new and useful Improvement in Wire-Nail Machines, of which the following is a specification.

Our invention relates to a new and useful improvement in wire-nail machines, and relates to that class of machines wherein the nail is formed from a coil of wire, and although the nail is pointed and headed it is not severed entirely from the wire, but a short stem is left between the point of one nail and the head of the nail directly in front of it, so that it leaves a slight connection between them, and thus will form a continuous string of nails, and the connection between the nails being so slight it is more flexible than the body of the nail and will allow this string of nails to be coiled again upon the reel, and when the reel is full the coil can be removed and placed in a machine designed to drive and use this style of nail.

The objects of our invention are, first, to so construct the mechanism that a nail will be made with a well-formed head and point; second, that notwithstanding the powerful leverage necessarily brought in play in forming the nail all the parts will work with such perfect regularity and precision that no undue strain will be brought to bear upon the string of nails after they have been formed to cause the same to be accidentally severed; third, to so construct the reeling mechanism that a coil of nails can be formed which when the coil is of a predetermined size can be removed from the reel for storage or immediate use, and thereby in shipping the coil of nails from one place to another it will be unnecessary to ship the reel therewith, as the coil will retain its shape and can be placed upon a reel of smaller size when desired for use.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

In carrying out our invention as here embodied, 1 represents a table upon which the operating mechanism rests. 2 represents legs which support this table.

3 is the main shaft of the machine, to which are secured all the operating-cams, and this shaft is journaled in the bearings 4 and 5. This shaft receives its motion by either being connected directly to the power or, as we have illustrated in the drawings, having a gear-wheel 6 secured to its outer end, and this gear-wheel meshing with the small gear-wheel 7, which is mounted upon the power-shaft 8.

The wire 9 passes from a reel through suitable straightening devices (not here shown) through the feeding mechanism, which will hereinafter be described, to the point-forming dies 10. These dies are composed of two members $10^a$ and $10^b$, one-half of the die being in each member. The member $10^b$ is adapted to slide longitudinally of the machine in the guideways 11. The member $10^a$ is pivoted to the member $10^b$ at the point 12. This member $10^a$ is thus adapted to rock from the pivot 12 for the purpose of opening and closing the dies and will also have a longitudinal movement, by reason of its being pivoted to the member $10^b$. The longitudinal sliding motion is accomplished by means of the toggle-levers 13 and 14, the levers 13 being pivoted to each side of the member $10^b$, the other ends of these levers being pivoted to the upright link 15, the lever 14 being pivoted to the standard 16, which is bolted to the bed-plate of the machine, the other end of the lever 14 being also pivoted to the link 15. Thus when the link 15 is raised or forced upward the distance will be shortened between the standard 16 and the member $10^b$ and the distance lengthened when the link is forced downward, thus giving a slight sliding motion to the dies 10. This vertical motion is communicated to the link 15 by means of the cam 17, which is secured to the main shaft 3. This cam operates upon the roller secured to the lower end of the lever 18, which lever is pivoted at the point 19 to a suitable bearing upon the lower side of the bed-plate. A lever 20 is also secured to the pivot 19, the other end of this lever being pivoted to the link 15. The rocking motion is communicated to the member $10^a$ of the die 10 by the cam-wheel 21, which is also secured upon the main shaft 3. This cam operates upon a roller journaled in the lower end of the lever 22, this lever being pivoted or fulcrumed on the rear end of the member $10^b$ of the die 10, the upper end of this lever being pivoted to a link 23, the other end of the link being in turn pivoted to the rear end of the member $10^a$. Thus when the lever 22 is rocked it will shorten or lengthen the distance between the rear ends of the member $10^a$ and $10^b$ and open or close the point-forming dies.

The head-forming dies 24 are composed of the two members $24^a$ and $24^b$. These members are pivoted together and also pivoted to the bearing 25 at the point 26, which forms the fulcrum for the members. The dies for grasping the wire are located in the members upon one side of the fulcrum 26, and the power is applied to the other end of the members on the opposite side from the fulcrum.

For the purpose of opening and closing the jaws of the die 24 I provide the toggle-levers 27 and 28. One end of the lever 27 is pivoted to the member $24^a$, and the lower end of the lever 28 is pivoted to the member $24^b$. These levers 27 and 28 are pivoted together at the point 29, and the inner end of a link 30 is pivoted to these levers also at the point 29. The outer end of the link 30 is pivoted to the upper end of a lever 31, which is journaled in a suitable bearing at the point 32, the lower end of the lever 31 being provided with the roller, which is adapted to travel in a cam-slot formed in the cam-wheel 33, which is mounted upon and adapted to revolve with the main shaft 3. The pivot 29 extends a short distance outward from each side of the levers 27 and 28 and is adapted to travel within a slot $34^a$, which is formed in standards 35, located upon each side of the die 24. This is for the purpose of giving an equal movement to both members $24^a$ and $24^b$. When the lever 31 is rocked and the levers 27 and 28 are forced out of a vertical position, the distance will be shortened between the ends of the members $24^a$ and $24^b$, and thus open the jaws which contain the dies.

Figure 1:
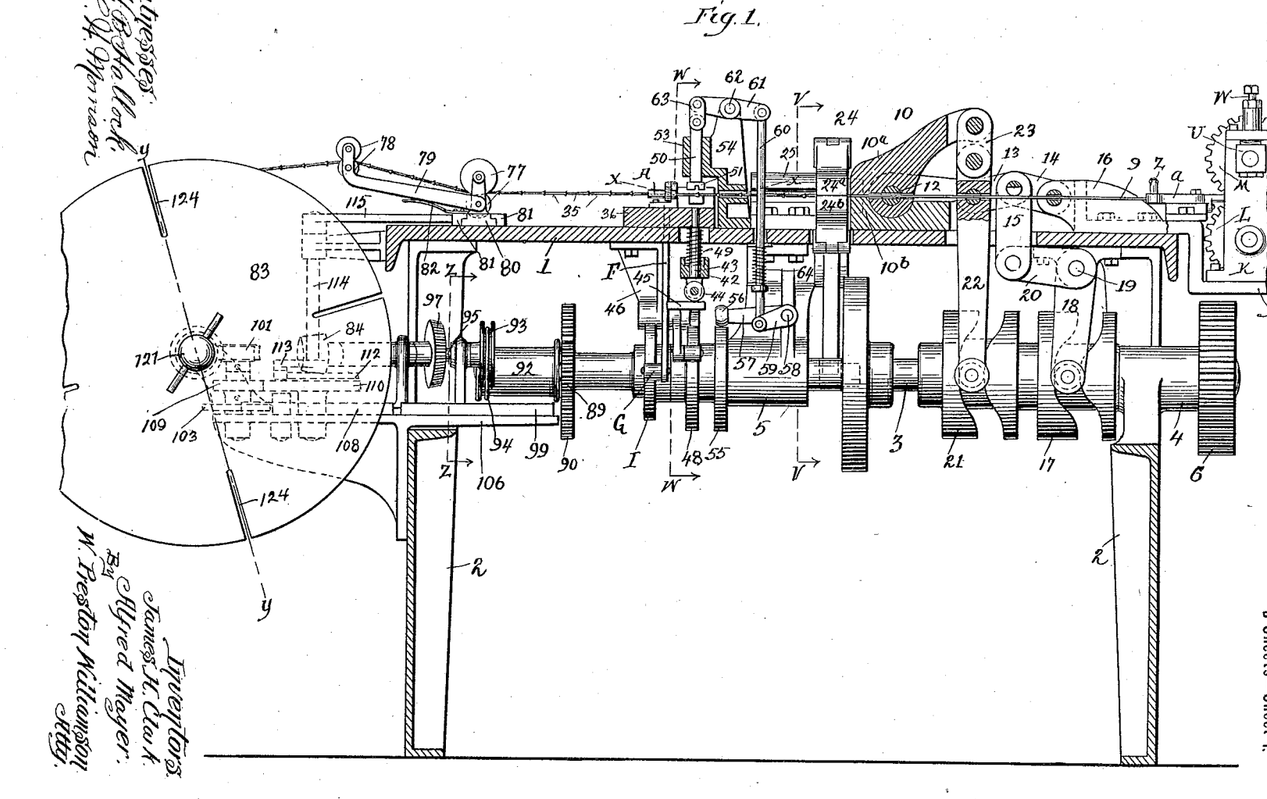
Figure 1 is a longitudinal vertical section of our machine, taken on the line along which the nails travel.
Figure 2:
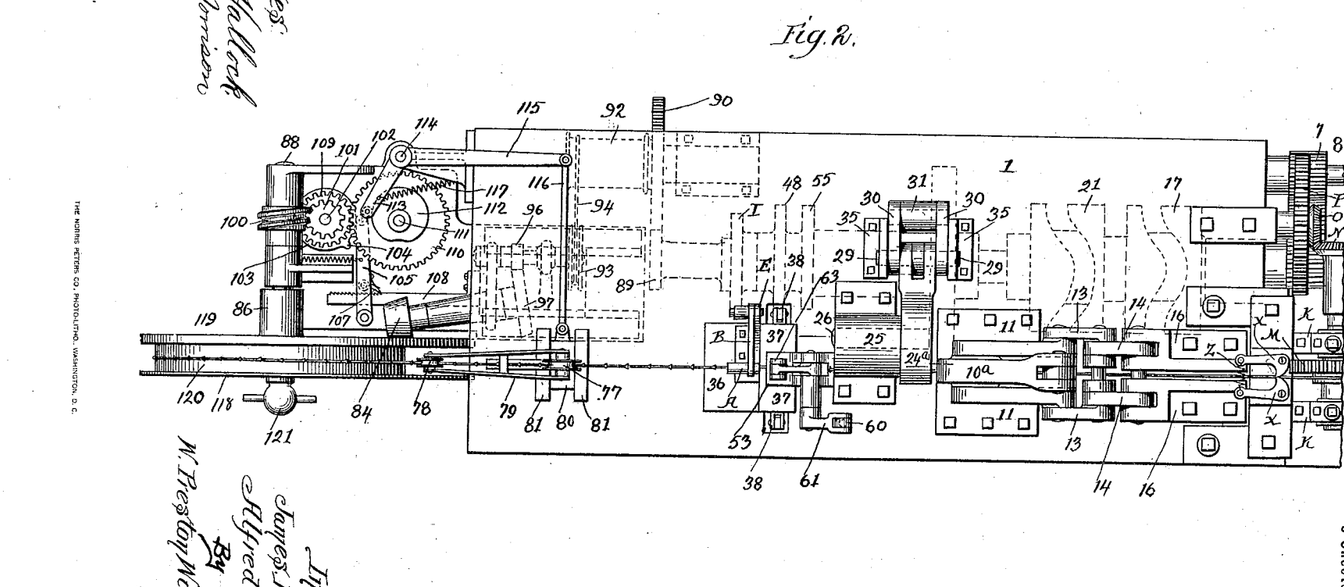
Fig. 2 is a plan view of our machine.
Figure 3:
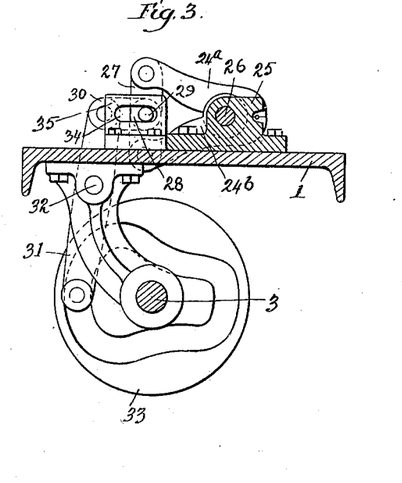
Fig. 3, a section on the line $vv$ of Fig. 1 looking in the direction of the arrow.
Figure 4:
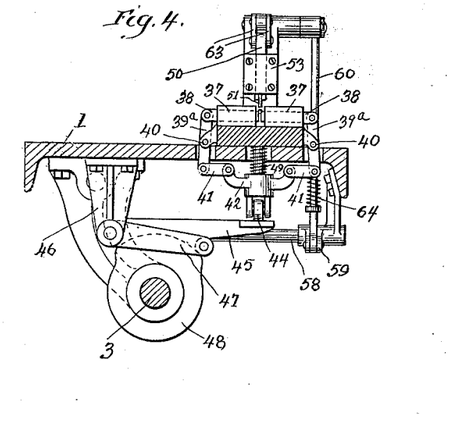
Fig. 4, a section on the line $ww$ of Fig. 1 looking in the direction of the arrow.

The operation of the dies for forming the nails is as follows: Both the point-forming dies 10 and the head-forming dies 24 will simultaneously close upon the wire, the head-forming dies 24 simply grasping the wire and holding the same against any lateral movement. The point-forming dies will form the pointed portion of the nail. When both of the jaws have closed on the wire and the point has been formed as just described, the dies will be in the position shown in Fig. 1, there being a slight distance between the dies 10 and 24. While these dies are still grasping the wire the die 10 will be forced forward in close contact with the die 24, and thus the short length of wire which was originally between the dies 10 and 24 will be upset and form the head of the nail, the shape of the head being determined by the die 24. While the formation of the head may be accomplished in one movement of the dies 10, we find by practical experience that in manufacturing large nails the strain is too great upon the machine, so we accomplish the formation of the head in two or more movements by so forming the cams 17, 21, and 33 that the head will only be partially formed by the first movement of the die 10, and then the jaws of the die 24 will be opened, and the die 10, while still grasping the wire, will be forced backward, drawing the wire with it, when the dies 24 will again close upon the wire, thus giving additional material with which to form the head, when the die 10 will be again forced forward to complete the head. Of course instead of two operations, as we have described, in extra-large machines three or even more operations could be used in forming the head, thus relieving the mechanism of considerable strain.

In forming the point of the nail the waste material sheared from off the wire in forming this point will form a thin film or fin 34 upon each side of the nail 35. The next operation after the formation of the nail is the trimming off of these fins 34, which is accomplished in the following manner: Extending upward from the plate 36 are guideways 37, in which the reciprocating plungers 38 are adapted to be guided. These plungers 38 have secured upon their inner ends the dies 39. These dies after the formation of the nail are adapted to be forced toward one another and grasp the nail so that the fins 34 will lie flat upon the top of these dies. The contour of each of these dies conforms exactly to one-half of the head, point, and the portion of the shank of the nail upon each side of the head. The forcing of this die inward for the purpose of grasping the nail is accomplished through the levers 39$^a$, the upper end of which being pivoted to the outer end of each of the plungers 38. These levers 39$^a$ are pivoted or fulcrumed to the plate 36 at the point 40. The lower ends of these levers are pivoted to the links 41, which are in turn pivotally connected to the vertically-reciprocating cross-head 42. This cross-head is adapted to be guided on the rod 43, which is rigidly secured in the plate 36. The cross-head has pivoted between two lugs, upon its under side, a roller 44. This roller rests upon the end of a lever 45, which lever is pivoted to the bearing 46, which is bolted to the under side of the bed-plate of the machine. A lever 47 is secured to the same pivot as the lever 45 and has pivoted thereupon a roller which is adapted to be always in contact with the periphery of the cam-wheel 48, which is mounted upon and adapted to rotate with the main shaft 3. Thereby when the lever 47, and consequently the end of the lever 45, is forced upward the cross-head 42 will be raised, and thus by reason of the links 41 and the levers 39$^a$ force the plungers 38 inward to grasp the nail. A spring 49 being interposed between the cross-head 42 and the under side of the plate 36 serves to force the cross-head downward when permitted to do so by the cam 48 for the purpose of releasing the nail. As soon as the dies 39 have grasped the nail and before the feeding has commenced a plunger 50 is caused to descend, and this plunger has secured to its lower end a flat plate 51. This plate is of about the same thickness as the shank of the nail, or of such thickness that it can pass between the dies 39 when they are closed upon the nail. A portion of the plate 51 is cut away at the point 52, so that when the plate 51 descends it will not strike upon the point or head of the nail, but will only come in contact with the shank of the nail upon each side of the head and point, as we have already described. The nails are grasped between the dies 39 so that the fins 34, which are to be trimmed off, lie flat upon the top of the dies. The plate 51 in descending will engage the shank of the nail and push the nails downward a slight distance below the level of the upper surface of the dies. Thus as the contour of the dies is the same shape as the completed nail the fins will be sheared off and the nail will be formed complete.

The vertical reciprocating plunger 50 is guided in the housing 53. This housing forms a part of the standard 54, which is depressed by means of the cam 55. A friction-roller 56 is journaled upon the end of a lever 57, and this roller rests upon the periphery of the cam 55. The lever 57 is secured to a cross-shaft 58, as is also the lever 59. This lever 59 has pivoted to its other end the rod 60, which passes upward and is pivoted to one end of the rocking lever 61. This lever is pivoted or fulcrumed at the point 62 on the standard 54. The other end of this lever 61 is connected to the plunger 50 by means of the link 63. Thus when the cam 55 rests the roller 56 and rod 60 will communicate the motion to the lever 61, which will be rocked so as to depress the plunger 50. A spring 64 is interposed between the bottom of the bed-plate, and a collar secured upon the rod 60 serves to return the different parts to their normal position after the roll 56 has passed the cam-surface. As soon as the vertical plunger 50 and horizontal plunger 38 have resumed their normal position the string of nails is raised from between the dies 39 as preliminary to the feeding of said string. This is done for the purpose of preventing the heads of the nails from coming in contact with either one of the dies 39 as said string of nails is fed forward. Of course the machine could be operated without this raising of the string of nails and is only used as a preventive against the possibility of an accident, for the plungers 38, carrying the dies 39, could be arranged so as to separate a greater distance than is shown in the drawings, and this would leave a free passage for the nails; but in practice it is preferable to give the plungers 38 only a slight movement, and therefore we prefer to use the raising mechanism, which consists of a guide made in the form of a tube A, which is formed with or secured to the end of the member B of a bell-crank lever C. This bell-crank lever is pivoted at the point D to a standard E, which is secured to the bed-plate of the machine. The member F of the bell-crank lever extends downward through a suitable slot in the bed-plate and has journaled upon its lower end the roller G, which is adapted to be held, by means of a spring H, always in contact with the periphery of a cam I, which is secured to and adapted to revolve with the main shaft 3. After this raising mechanism has operated so as to raise the string of nails from between the dies 39 the string of nails is fed forward in the following manner: Upon the end of the machine nearest the reel upon which the wire is fed a platform J is secured to or formed with the bed-plate of the machine. Upon this platform are secured two standards K, in which are journaled the two spur-wheels L and M, arranged one above the other and adapted to mesh together. The lower spur-wheel L is journaled in stationary bearings within the standards K and is adapted to be driven by the bevel-wheel N, secured upon the same shaft as the spur-wheel L, which bevel-wheel meshes with a second bevel-wheel O, which is secured to and adapted to revolve with the gear-wheel P, which is journaled in suitable bearings secured to the framework of the machine. This gear-wheel P meshes with and is adapted to be driven by the gear-wheel 6, and thus the gears L and M are caused to constantly revolve. Secured upon one face of the spur-wheel L is a circular disk Q, which has an annular groove R formed in its periphery, in which is adapted to lie the wire 9 as it passes from the straightening device. Secured upon one face of the spur-wheel M is a block S, which has a surface T, which surface is arranged so that when it is revolved by the spur-wheel M it will contact the wire 9 when it is in its lowest position vertically so as to grip said wire between this surface and the groove-disk Q, and as the spur-wheel M continues to revolve will force the wire forward a predetermined distance and regulated by the length of the surface T. The sides of the several gears driving the spur-wheels L and M are of such a size relative to one another that the surface T will contact the wire just after the bell-crank lever C has raised the string of nails from between the dies 39, and while the jaws of both of the nail-forming dies are open and before the block S and surface T have made another revolution another nail is formed and trimmed. For the purpose of preventing the surface T when it comes in contact with the wire from indenting the same and also for relieving the strain we journal the spur-wheel M in sliding blocks U, which blocks are guided in suitable guideways formed in the standards K. Upon each of these sliding blocks and bearing upon the same are placed springs V. The upper ends of these springs bear against the end of the adjusting-bolt W, and by means of this bolt any degree of tension can be given to said springs.

For the purpose of preventing the wire 9 from being fed forward by reason of the friction of the grooved disk Q against the wire, which might feed the wire slightly forward and cause the same to kink, we provide two cams X X, which are pivoted to the framework of the machine at Y Y, and these cams bear against the wire 9 upon each side and are held in frictional contact by means of the springs Z and each of said springs being attached to the ends of the arms a, extending from the cams X. The tension of the springs upon the cams is such that when the surface T comes in contact with the wire this wire can be pushed forward easily between the cams; but the tension upon the wire by the cams will prevent the wire from being fed forward by simply the frictional contact of the disk Q.

Figures 5, 6:
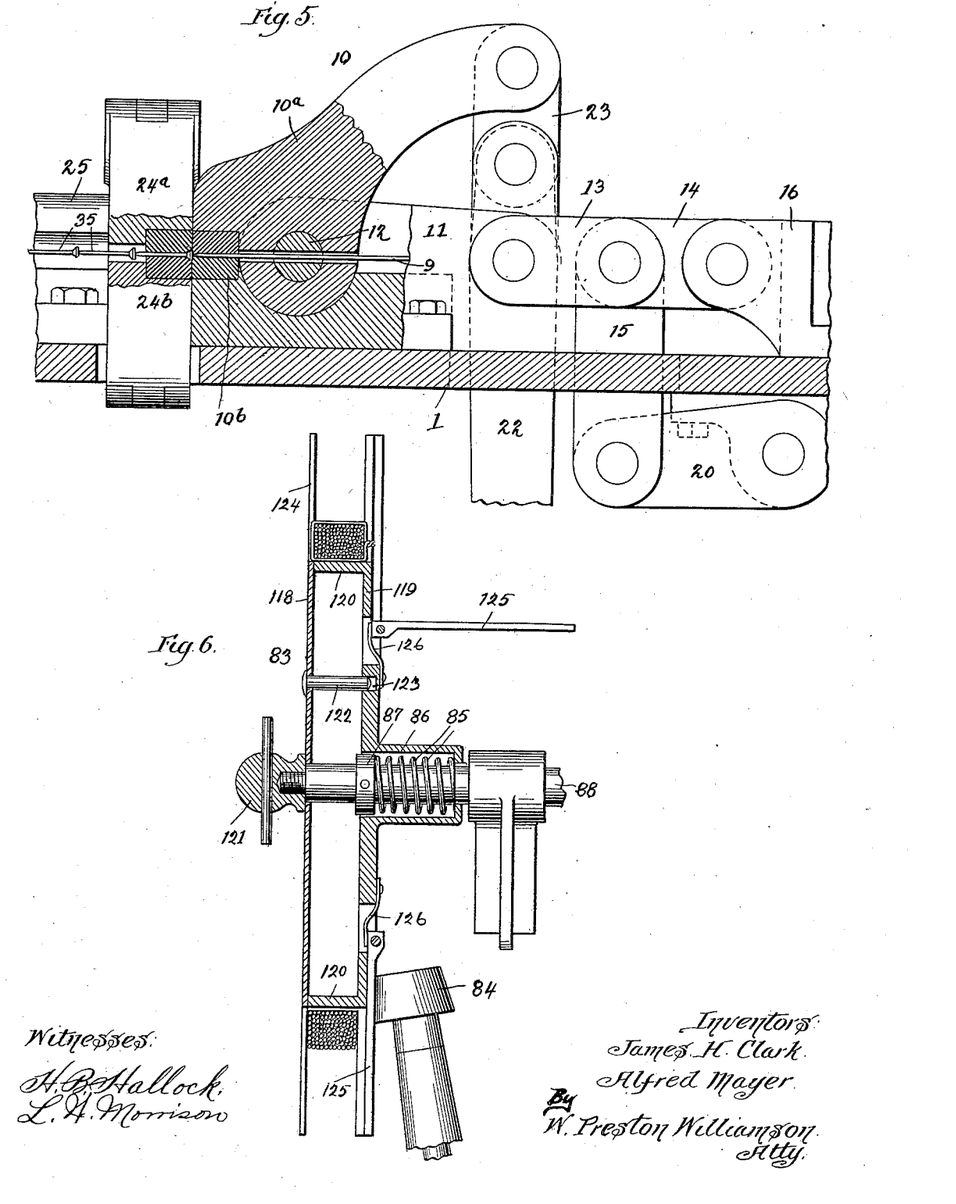
Fig. 5, an enlarged detail view of the dies, showing the dies in the position they would assume when forming the head of the nail.
Fig. 6, a section of the reel upon the line $yy$ of Fig. 1.
Figure 7:
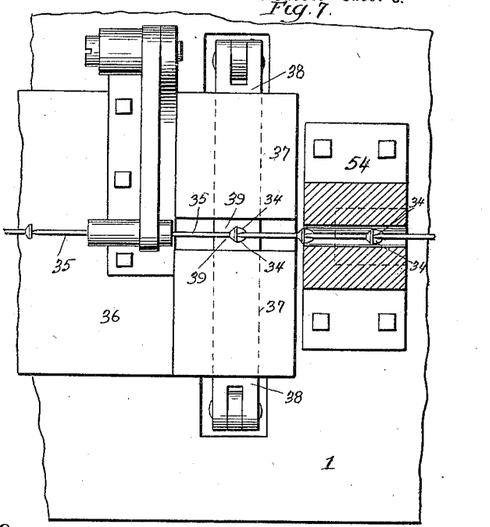
Fig. 7, an enlarged sectional plan of the trimming mechanism, the section taken on the line $xx$ of Fig. 1.
Figures 8, 9, 10, 11:
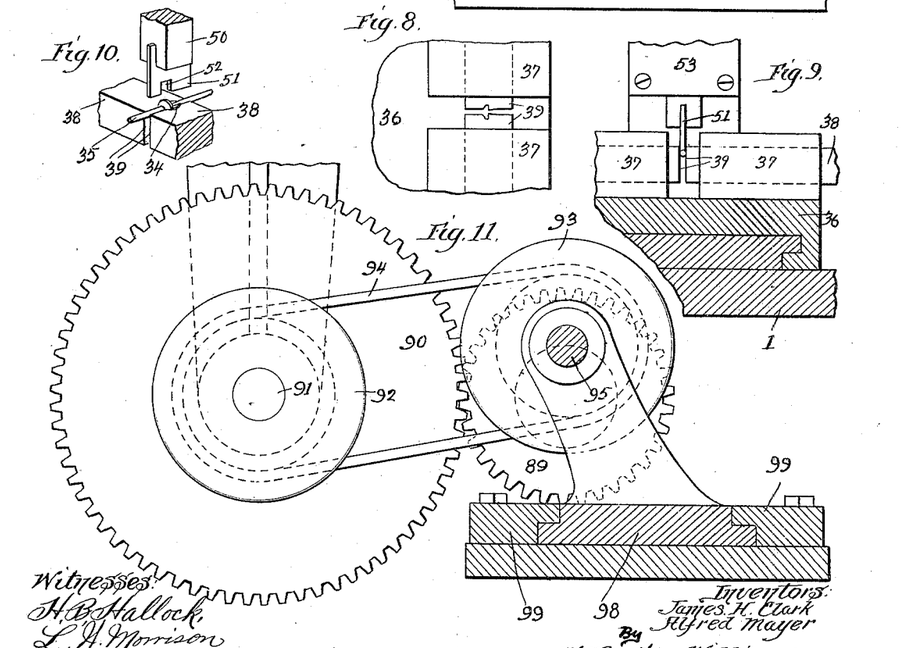
Fig. 8 is a detail plan view of the inner ends of the dies which grasp the nail for the purpose of feeding and also for the purpose of trimming the nail.
Fig. 9 is a detail front view of the dies shown in Fig. 8, showing the plunger forcing the nail downward between the dies for the purpose of trimming the same.
Fig. 10 is a perspective view of a portion of the dies and plunger shown in Fig. 9.
Fig. 11, a section on the line $zz$ of Fig. 1 looking in the direction of the arrow.
Figure 12:
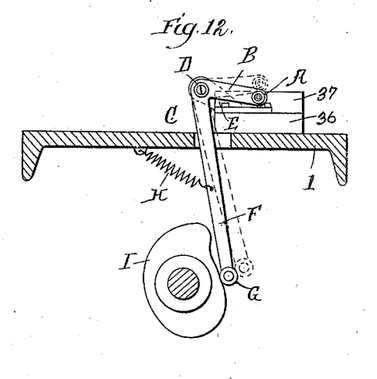
Fig. 12, a section across the bed-plate of the machine, showing in detail the mechanism for raising the string of nails preliminary to the feed.
Figure 13:
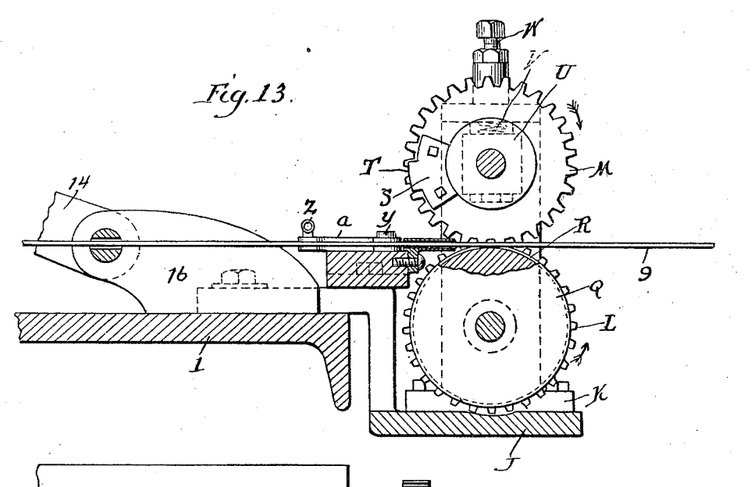
Fig. 13 is a longitudinal section through the feeding mechanism.
Figure 14:
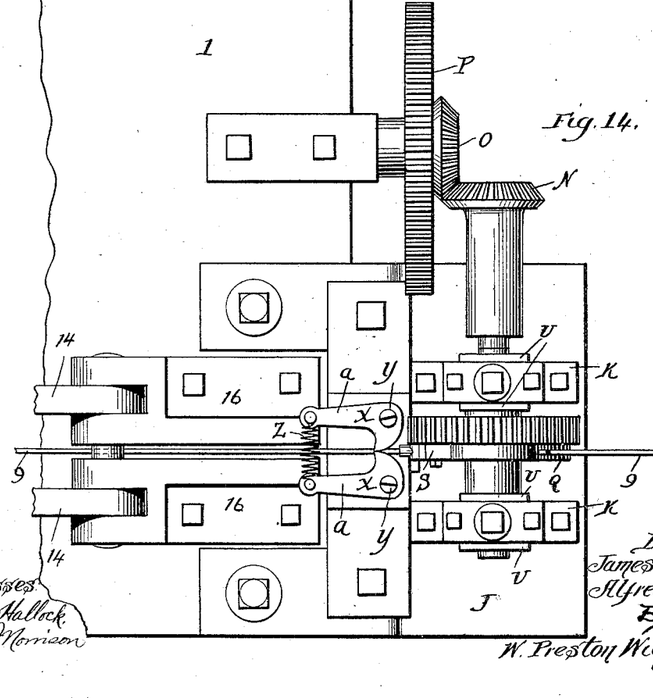
Fig. 14, a plan view of one end of the machine, showing in detail the feeding mechanism.

The string after being fed forward passes from the trimming mechanism between the guide-rollers 77 and from there through the second pair of guide-rollers 78. This pair of guide-rollers 78 is pivoted at the forward end of the lever 79, which lever is pivoted at its rear end to the other standard, which supports the guide-roller 77. The standard in which the guide-rollers 77 are journaled is secured to or forms a part of a block 80, which block is adapted to slide crosswise of the bed-plate within the guides 81 for the purpose hereinafter described. A spring 82 is secured to one of the guides 81 and bears against the under surface of the lever 79, thus tending to always keep the lever and guide-rollers 78 in an elevated position. The wire after passing through the guide-rollers 78 is wound upon the reel 83. This reel is given a steady revolving movement by mechanism hereinafter to be described. The purpose of the spring-actuated lever 79 is for taking up the slack in the string of nails when the said string is fed forward, for when the said string is fed forward the movement is so rapid that if the string of nails went directly from the roll 77 to the reel it would at some place between the dies 39 and the reel 83 be liable to bend from the straight line in a sharp turn, which might break the connection between the nails, and thus sever the string, for the reel having only a steady motion could not take up the slack as fast as the feeding mechanism feeds the string forward; but the movement of the reel is so regulated that it will take up that slack before the next movement of the feeding mechanism. The lever 79, carrying the guide-roll 78, will swing upward and take up this slack as the string is fed forward, and as the reel gradually revolves the lever will be pulled downward until the string of nails is in a straight line. The reel 83 is revolved by means of a friction-roll 84, which bears against the inner face of the reel. This face of the reel is always kept in frictional contact with the roll 84 by means of the spring 85, as shown in Fig. 6. This spring 85 is located in an annular chamber in the hub 85 and is interposed between the end of the hub and a collar 87, which is secured to the reel-shaft 88. This frictional roll 84 is revolved in the following manner:

Upon the forward end of the main shaft 3 is secured a gear-wheel 89. This gear-wheel 89 meshes with a larger gear-wheel 90, which is secured to a shaft 91, journaled in suitable bearings suspended from the bed-plate of the machine.

92 is a pulley, which is secured to the shaft 91 forward of the gear-wheel 90.

93 is a pulley mounted upon a short shaft 95, and this pulley 93 is adapted to be revolved by means of a belt 94, which surrounds both the pulleys 92 and 93, also secured upon the shaft 95, and adapted to revolve therewith is the small spur-wheel 96. This spur-wheel meshes with a gear-wheel 97, which is secured to the same shaft as the friction-roll 84. Thus the motion is communicated from the power-shaft through the gear-wheels 89 and 90, pulleys 92 and 93, and gears 96 and 97 to the friction-roll and from there to the reel.

As is well understood, if the string of nails is wound upon the reel the coil would gradually grow larger in diameter, and the reel revolving at the same given rate of speed would when the coil had increased in diameter wind more of the length of the string than it had in the beginning—that is to say, if the speed of the reel was regulated so that in the beginning it would just take up the slack which had been fed forward it would after the first layer had been wound upon the reel tend to take up more than the slack, and thus exert a strain upon the string which would break the same. To overcome these disadvantages, we provide mechanism whereby the friction-roll is caused to gradually recede toward the outer edge of the reel as the reel revolves. Thus the reel will be caused to gradually revolve slower and slower as the coil increases in size, and this movement is so regulated that it will just take up the slack between each feed of the machine. The mechanism for accomplishing this receding movement of the friction-roll is as follows:

The shaft to which the friction-roll 84 and the gear-wheel 97, and also the shaft 91 which carries the gear-wheel 96 and the pulley 93, are mounted in bearings, which bearings are secured to or form a part of a block 98 which is adapted to slide longitudinally within the guides 99, which are secured to a secondary table 106, which supports the bearings in which the reel is journaled and all the mechanism connected with the reel.

100 is a worm, which is secured to the reel-shaft 88, and this worm meshes with and is adapted to revolve a worm-wheel 101, which is secured to the short upright shaft 102. Also secured to this shaft is a cam-wheel 103. This cam-wheel has a tooth 104 formed upon its periphery, which tooth at every revolution of the shaft 102 will strike a roller which is secured upon the end of the lever 105. This lever is pivoted to the table 106. The lever 105 carries a pawl 107, which pawl is adapted to engage teeth formed in the edge of an extension 108, which is secured to the forward end of the sliding block 98. Thus at each revolution of the cam-wheel 103 the lever 105 will be actuated, which will feed the extension 108, and thereby the block 98, carrying the roll 84, rearward the distance of one tooth, the pulley 92 being made of such a length that it will allow the belt 94 to travel back and forth in its movement and still not interfere with the transmission of the motion.

The guide-rolls 77 and 78 are caused to slide backward and forward crosswise of the machine for the purpose of winding the string of nails evenly upon the reel. This is accomplished in the following manner: Secured upon the upright shaft 102 is a gear-wheel 109. This gear-wheel meshes with a larger gear-wheel 110, which is mounted upon a short upright shaft 111. Also secured to this upright shaft 111 is a cam 112, against the periphery of which bears a roller secured upon the end of a lever 113, which lever is secured to an upright shaft 114, which is journaled in suitable bearing and extends upward above the surface of the bed-plate 1 and has secured upon its upper end the arm 115. This arm has secured to its other end the link 116, which link is in turn secured to the sliding block 80, which carries the guide-rolls 77 and 78. Thus the cam will cause the block to slide in one direction, and a spring 117, secured to the lever 113 at one end and the framework of the machine at the other end, will cause the block to slide in the opposite direction.

The reel 83 is composed of the two sections, 118 which is the removable section, and 119 which has secured to it the drum portion 120. The part 118 of the reel is simply a circular plate which is secured upon the shaft by means of the hand-nut 121 being screwed upon the end of the shaft and binding the plate 118 in place, a pin 122 being secured in the plate 118 and registering with and entering a hole 123, formed in the section 119 for the purpose of making it possible to replace the plate 118 in the same position after it has been removed. The string of nails after being wound upon the drum between the two sections 118 and 119 and formed in a coil of sufficient size is removed by removing the plate 118 and sliding the coil from off the drum 120. For the purpose of keeping the strands of the coil from spreading when the coil is to be shipped it is advisable to bind the coil together at intervals with wire. This we accomplish while the coil is still upon the reel by providing a number of slots 124 through both the sections 118 and 119, the slots extending from the drum outward to the edge of the reel, a groove being cut through the periphery of the drum 120 to correspond with the slots 124, and a wire is pushed through the slots and the groove and bound against the coil with a slight twist, thus binding the coil in a compact form. When the plate 118 is then removed, the coil can be easily slid from off the drum 120 and be in proper form for shipping. As the friction-roll 84 bears against the inner surface of the member 119 of the reel, the slots 124 would interfere with the working of this friction-wheel, so we provide the slots 124 in the section 119 with the spring-arms 125, which are pivoted to the reel and when closed will lie flush with the inner surface of the member 119, so that it presents no impediment to the movement of the friction-roll 84. When the wires are about to be bound around the coil, these arms can be sprung open in the position shown in Fig. 6, the springs 126 serving to hold these arms in either position.

In operation the wire after passing from the reel through the usual straightening devices and also through the feeding mechanism is grasped by both the dies 10 and 24, the die 10 forming the point, and when the die 10 is forced forward the short length of wire which lies between the dies 10 and 24 will be upset to form a portion of the head. Then the jaws of the die 10 will open and the die 10, while still grasping the wire, will be moved backward to its original position, when the jaws of the die 24 will be again caused to grasp the wire and the forward movement of the die 10 to again be brought about to upset the second short portion of wire between the dies 10 and 24, and thus complete the head. Both the jaws of the dies 10 and 24 will then open, the die 10 sliding back to its original position, and simultaneously with the opening of the jaws the dies 39 and plungers 38 will be moved toward one another and grasp the string of nails at this point, when the plunger 50 will descend for the purpose of trimming the fin 34 from the nail, the plunger immediately returning to its original position, and then the feed mechanism operates to feed the plate 36 forward, when the spring-arm 79 and guide-roll 78 will take up the slack and the string of nails will be reeled, as before described.

Having thus fully described our invention, what we claim as new and useful is—

1. In combination with a machine of the character described, a framework, a main shaft journaled in suitable bearings upon said framework, a point-forming die composed of two members pivotally connected, a cam secured to the main shaft adapted to open and close the said point-forming die through the medium of a system of levers, a grasping and head-forming die composed of two members pivotally connected together, a cam secured to the main shaft for the purpose of opening and closing said die through a system of levers, a cam secured to the main shaft adapted to move the point-forming die through a system of levers longitudinally toward and away from the head-forming die, two plungers adapted to move toward or away from the string of nails, a cam located upon the main shaft and adapted, through the medium of the system of levers, to force said plungers toward the string of nails, a spring adapted to return said plungers to their original position at the proper time, dies secured to the inner ends of said plungers, the contour of each of said dies being of the shape of the desired form of nail, the said dies, when the plungers are forced inward, adapted to grasp the nail below the fin which is to be trimmed off, a plunger adapted to reciprocate vertically in suitable guideways, said plunger adapted to be forced downward and engage the shank of two nails upon each side of the head and point for the purpose of forcing the string of nails a slight distance downward between the dies, a cam secured to the main shaft and adapted to force the plunger downward through the medium of the system of levers, a spring for the purpose of returning the plunger to its original position at the proper time, a bell-crank lever pivoted to the main frame of the machine, a guide through which the string of nails passes formed with or secured to the end of the horizontal member of the bell-crank lever, a roller journaled in the lower end of the vertical member of the bell-crank lever, a cam secured to and adapted to revolve with the main shaft of the machine and operate against said roller for the purpose of raising the string of nails at the proper time, a spring for returning the lever to its normal position, a rotary feeding mechanism consisting of two spur-wheels arranged one above the other and in mesh with each other, suitable standards in which said spur-wheels are journaled, means for communicating motion to the lower spur-wheel, sliding blocks in which the upper spur-wheel is adapted to be journaled, said blocks adapted to slide in suitable guideways in the standards, springs arranged above said blocks and adapted to exert pressure downward upon the same, adjusting devices arranged above said springs for the purpose of adjusting the tension of the same, an annular grooved disk secured to the face of the lower spur-wheel, a block secured to the one face of the upper spur-wheel, a surface carried by said block adapted to contact the wire upon every revolution of the spur-wheel for the purpose of feeding the same forward, frictional cams arranged in front of the feeding mechanism adapted to exert pressure upon each side of the wire at all times, a reel upon which the string of nails is adapted to be wound, a guide-roll through which the string of nails is guided from the feeding device of the reel, a guide-roll pivoted to a spring-actuating lever for the purpose of taking up the slack in the string of nails as the same is fed forward, means dependent upon the revolution of the reel for sliding the guide-rolls backward and forward the width of the reel for the purpose of evenly winding the string of nails, a friction-roll adapted to bear against one side of the reel for the purpose of revolving the same, movement communicated to the said friction-roll from the main shaft, means dependent upon the revolution of the reel for moving the friction-roll gradually toward the periphery of the reel, substantially as described and for the purpose specified.

2. In combination with a machine of the character described, a suitable framework, a main shaft journaled in suitable bearings upon said framework, a point-forming die composed of two members pivotally connected together, one member being adapted to slide longitudinally of the machine in suitable guideways, the other member adapted to rock upon a pivot for the purpose of opening and closing the dies and adapted to slide longitudinally with the other member, toggle-joint interposed between the rear ends of the two members, a pivoted lever adapted to operate upon said toggle-joint for the purpose of opening and closing the jaws of the die, a cam secured to the main shaft for the purpose of rocking said lever, a grasping and head-forming die composed of two members, said members connected together by a pivot, said pivot having a bearing upon the main shaft of the machine, a toggle-joint being interposed between the two ends of said members, a lever pivoted to the main frame of the machine adapted to operate upon said toggle-joint when said lever is rocked for the purpose of opening and closing the jaws of the head-forming die, a cam secured to the main shaft of the machine for the purpose of engaging said lever and rocking the same, a toggle-joint interposed between the rear end of the point-forming die, and a stationary standard secured to the bed-plate of the machine, levers adapted to operate upon said toggle-joint for the purpose of forcing the point-forming die toward and away from the head-forming die, a cam secured to the main shaft of the machine adapted to operate upon said levers, means for trimming the waste material from the nail after passing from the dies, means for feeding the string of nails forward a predetermined distance, means for guiding and reeling said string of nails into a coil, substantially as described and for the purpose specified.

3. In combination with a machine of the character described, point-forming dies composed of two members pivotally connected together, said dies adapted to open vertically, head-forming dies composed of two members pivotally connected together and adapted to open vertically, cams secured to the main shaft of the machine adapted to actuate mechanism for opening and closing both of said dies, a cam secured to the main shaft of the machine and adapted to actuate mechanism to cause the point-forming die to be forced toward and away from the head-forming die, the cam-surfaces upon all of the said cams being formed in such a manner that the longitudinally-sliding point-forming dies will move backward and forward twice in the formation of the head of the nail, the head-forming die opening and closing at the proper intervals to permit this movement, the point-forming die remaining closed until the head is formed, substantially as described and for the purpose specified.

4. In combination in a machine of the character described, nail-forming dies with trimming mechanism consisting of two horizontal plungers, each of said plungers having secured upon its inner end a die, each of said dies having a contour of the shape of one-half of the head and point of the nail where they are joined together, said plungers and dies adapted to reciprocate toward and away from one another transversely to the line of travel of the nails, suitable housings for guiding said plungers, a system of levers for forcing said plungers toward one another, a cam secured to the main shaft of the machine adapted to operate upon said system of levers for forcing the said plungers inward at the proper time, a spring adapted to operate to force said plungers apart at the proper time, said plungers when brought together adapted to grasp the string of nails below the portion to be trimmed off, a vertical plunger arranged above the point where the two horizontal plungers grasp the string of nails, said plungers adapted to be reciprocated vertically in suitable bearings, the end of said plunger being so formed that when it is forced downward it will engage the shank of the nails upon each side of the head and point and press the said string of nails downward between the dies, a system of levers for communicating motion to the vertically-reciprocating plunger, a cam secured to the main shaft of the machine for operating upon said system of levers for forcing the vertical plunger downward, a spring adapted to operate upon said system of levers and permitted to do so by the cam for the purpose of raising and holding said vertical plunger in its upper or normal position, substantially as described and for the purpose specified.

5. In a machine of the character described, the combination of nail-forming dies, trimming and feeding mechanism with reeling mechanism consisting of a reel mounted upon a shaft journaled in suitable bearings, said reel adapted to be driven by a friction-roller bearing against one side of said reel, a spring interposed between the hub of said wheel and a collar upon its shaft for the purpose of keeping said reel in contact with the friction-roller, said friction-roller being mounted upon a shaft which is journaled in bearings secured to a longitudinally-sliding plate, motion being communicated to the friction-roller through a pulley also mounted in bearings secured to said sliding plate, said pulley receiving its motion through a belt which passes over said pulley and also around a stationary drum, which drum receives its motion from the main shaft of the machine, a worm mounted upon the reel-shaft and adapted to revolve, a worm-wheel mounted upon a vertical shaft, a cam-wheel also mounted upon said vertical shaft and adapted to be revolved by the worm-wheel, a lever, one end being pivoted to the main frame of the machine, the other end adapted to lie in contact with said cam-wheel, a pawl pivoted to said lever and adapted to engage ratchet-teeth formed in an extension connected to the longitudinally-sliding plate for the purpose of sliding said plate rearward a slight distance whenever said lever is rocked by the said cam-wheel, a spring for returning said lever to its normal position when permitted to do so by the cam, guide-rollers through which the string of nails is adapted to be guided, means controlled by the revolution of the reel for sliding said guide-rollers laterally backward and forward a distance equal to the distance of the coil to be formed for the purpose of evenly winding the said coil, substantially as described and for the purpose specified.

6. In combination with a machine of the character described, a reel adapted to be revolved at a decreasing rate of speed as the coil wound thereon enlarges, a pair of guide-rollers between which the string of nails is guided, said guide-rolls being journaled in suitable bearings formed with or secured to a lateral sliding block, suitable guideways for guiding said block, a supplemental pair of guide-rolls between which the string of nails also passes and is guided, said guide-rolls being journaled in the forward end of a lever pivoted to the sliding block, a spring arranged to exert pressure upward upon said lever for the purpose of taking up the slack in the string of nails when the said string is fed forward, a link pivoted to the sliding block at one end, the other end of said link being pivoted to a lever which is in turn mounted upon a vertical shaft, a lever also secured to the vertical shaft and having a roller at its outer end adapted to bear against the periphery of a cam-wheel, said cam-wheel adapted to be revolved through suitable mechanism connected with the reel-shaft, said cam adapted to force the sliding block and guide-rolls gradually toward one side of the reel, a spring adapted to return the sliding block and guide-rolls to the other side of the reel for the purpose of evenly winding the coil, substantially as described and for the purpose specified.

7. In combination with a machine of the character described, a reel consisting of one member having a drum formed thereon, said member adapted to be driven through power being communicated to it through the main shaft of the machine, a second member consisting of a disk adapted to be removably secured to the reel-shaft, a pin secured in the removable member and adapted to register with and enter a hole formed in the permanent member, a plurality of slots formed through both members and extending from the drum outward to the periphery for the purpose of binding the coil with wire or the like while the same is upon the reel, fingers pivoted to the permanent member of the reel and adapted to lie within the slots in said member and be flush with the inner face of the reel when the coil is being formed, said fingers adapted to be swung outward and held in that position so as to leave the slots accessible for the binding of the coil, substantially as described and for the purpose specified.

In testimony whereof we have hereunto affixed our signatures in the presence of two subscribing witnesses.

JAMES H. CLARK.
ALFRED MAYER.

Witnesses:
H. B. HALLOCK,
L. W. MORRISON.